(12) United States Patent
Hopkins

(10) Patent No.: US 7,966,201 B1
(45) Date of Patent: *Jun. 21, 2011

(54) SYSTEMS AND METHODS FOR MODELING INSURANCE COVERAGE

(75) Inventor: John C. Hopkins, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/050,385

(22) Filed: Mar. 18, 2008

(51) Int. Cl.
*G06Q 40/00* (2006.01)
(52) U.S. Cl. .......................................................... 705/4
(58) Field of Classification Search ....................... 705/4
See application file for complete search history.

(56) References Cited

U.S. PATENT DOCUMENTS

| | | | |
|---|---|---|---|
| 4,491,725 | A | 1/1985 | Pritchard |
| 4,492,940 | A | 1/1985 | Hikita |
| 5,523,942 | A * | 6/1996 | Tyler et al. ........................ 705/4 |
| 7,392,201 | B1 * | 6/2008 | Binns et al. ...................... 705/4 |
| 7,831,451 | B1 | 11/2010 | Morse et al. |
| 2002/0116231 | A1 | 8/2002 | Hele et al. |
| 2004/0088202 | A1 | 5/2004 | Radigan |
| 2007/0118411 | A1 | 5/2007 | Conner et al. |
| 2007/0156463 | A1 | 7/2007 | Burton et al. |
| 2007/0233615 | A1 | 10/2007 | Tumminaro |
| 2007/0244811 | A1 | 10/2007 | Tumminaro |
| 2007/0255620 | A1 | 11/2007 | Tumminaro et al. |
| 2007/0255652 | A1 | 11/2007 | Tumminaro et al. |
| 2007/0255653 | A1 | 11/2007 | Tumminaro et al. |
| 2007/0255662 | A1 | 11/2007 | Tumminaro |
| 2009/0048877 | A1 | 2/2009 | Binns et al. |

OTHER PUBLICATIONS

The Case for Optimizing Your Insurance. Wyman et al., 2007.*
Insurance Reviews. C-Risk, Consultants in Risk Management, 2001.*
C-Risk, Consultants in Risk Management, "Insurance Reviews", copyright 2001. Retrieved from the Internet: <http://www.c-risk.com/Client_Services/Ins_Reviews_01.htm>, 2 pages total.
Wyman, "Case for Optimizing Your Insurance," copyright 2006-2007. Retrieved from the Internet: <http://www.oliverwyman.com/ow/pdf_files/case_for_opt_insurance_ERC_1106(1).pdf>, 12 pages total.
Schori et al., "A Level Playing Field," LIMRA's MarketFacts, Mar./Apr. 1998; 17(2):48.
Today's News "Progressive.com Named one of 10 'Web Sites That Work' by information Week Magazine" downloaded from the Internet: <http://www.prnewswire.com/cgi-bin/stories.pl?ACCT=104&STORY=www/story/8-30-...> on Apr. 30, 2004, 1 page total.

* cited by examiner

*Primary Examiner* — Hani Kazimi
*Assistant Examiner* — Clifford Madamba
(74) *Attorney, Agent, or Firm* — Kilpatrick Townsend & Stockton LLP

(57) ABSTRACT

A method, system and computer-usable medium are disclosed for the modeling of insurance coverage. Coverage parameters of a policy are displayed as graphical elements within a user interface (UI) of a computing device along with a plurality of claim scenario parameters for selection by a user. Once selected, the claim scenario parameters are applied to relevant claim data and a claim scenario is generated. The claim scenario is then applied to the policy coverage parameters of the policy to determine and graphically display coverage parameter disparities, which are then graphically modified to offset any coverage parameter disparities. As coverage parameters are modified, corresponding adjustments to the premium of the current policy are made and displayed within the UI. A resulting policy is generated, using the modified coverage parameters of the current policy and adjusted premiums, and then fulfilled, electronically or physically.

21 Claims, 11 Drawing Sheets

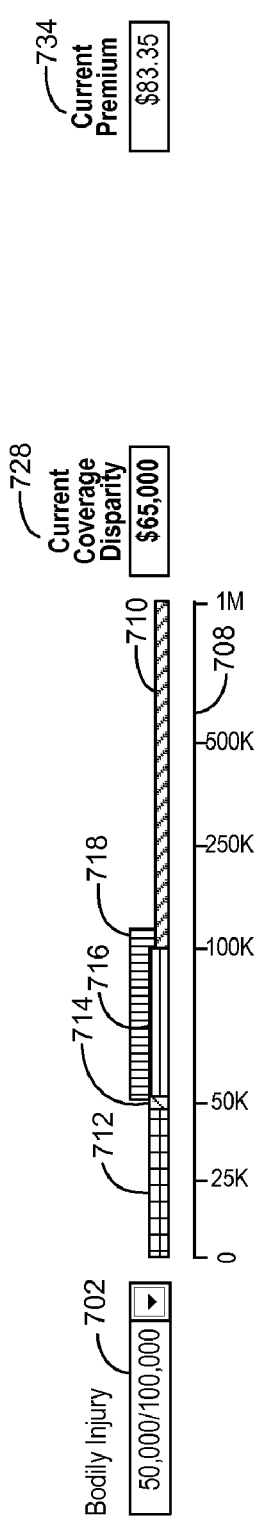
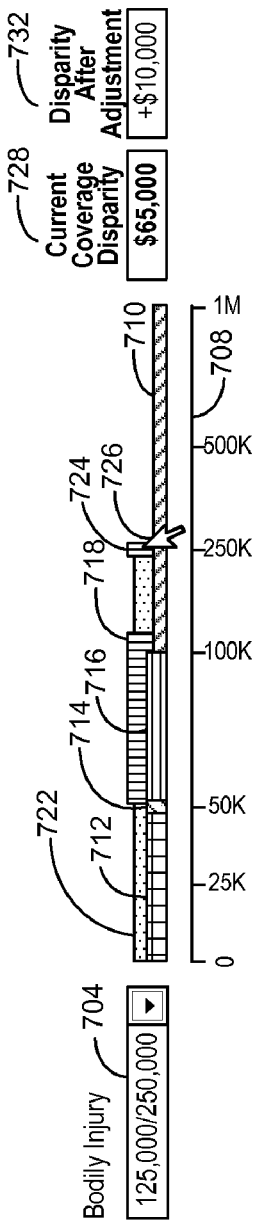
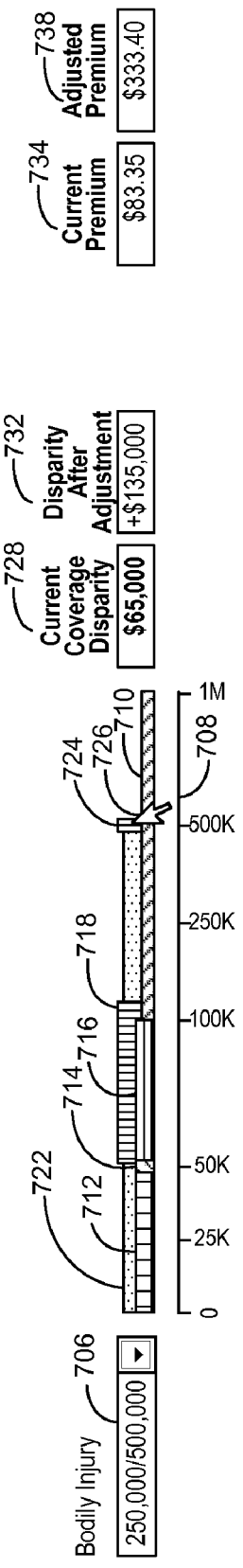
FIGURE 7a
FIGURE 7b
FIGURE 7c

SYSTEMS AND METHODS FOR MODELING INSURANCE COVERAGE

CROSS REFERENCE TO RELATED APPLICATIONS

U.S. patent application Ser. No. 12/050,355, entitled "Systems and Methods for Modeling Insurance Coverage," inventor John C. Hopkins, filed on Mar. 18, 2008, describes exemplary methods and systems and is incorporated by reference in its entirety.

U.S. patent application Ser. No. 12/050,362, entitled "Systems and Methods for Modeling Insurance Coverage," inventor John C. Hopkins, filed on Mar. 18, 2008, describes exemplary methods and systems and is incorporated by reference in its entirety.

U.S. patent application Ser. No. 12/050,389, entitled "Systems and Methods for Modeling Insurance Coverage," inventor John C. Hopkins, filed on Mar. 18, 2008, describes exemplary methods and systems and is incorporated by reference in its entirety.

U.S. patent application Ser. No. 12/050,410, entitled "Systems and Methods for Modeling Recommended Insurance Coverage," inventor John C. Hopkins, filed on Mar. 18, 2008, describes exemplary methods and systems and is incorporated by reference in its entirety.

U.S. patent application Ser. No. 12/050,417, entitled "Systems and Methods for Modeling Recommended Insurance Coverage," inventor John C. Hopkins, filed on Mar. 18, 2008, describes exemplary methods and systems and is incorporated by reference in its entirety.

BACKGROUND

1. Field of the Disclosure

Embodiments of the disclosure relate in general to the field of computers and similar technologies, and in particular to software utilized in this field. Still more particularly, it provides a system, method, and computer-usable medium for the modeling of insurance coverage.

2. Description of the Related Art

Industry studies indicate that there is a general lack of awareness among consumers regarding their insurance coverage, with a large percentage of policy holders mistakenly believing that they are better protected than they actually are. Determining optimum levels of coverage is often challenging for a policy holder, since historical or statistical claim information is generally not available. However, even when appropriate claim information is available, its meaningful interpretation and application is still a major challenge for most policy holders. Accordingly, the services of an insurance professional are often required. Yet even professionals in the insurance industry are not always able to ascertain an optimum balance between appropriate coverage levels and acceptable premium costs. Consequently, many consumers are underinsured, exposing them to unforeseen financial liabilities. Conversely, some consumers incur needless insurance costs as a result of being inadvertently overinsured.

In view of the foregoing, there is a need for the ability to model the coverage of an insurance policy against a predetermined claim scenario and, once modeled, to adjust coverage parameters to determine the optimum level of coverage. It will be appreciated that the ability to graphically represent the resulting coverage model would further its usability. It will likewise be appreciated that these capabilities would be further enhanced by the ability to not only model the pricing effects that result from modifications to coverage parameters, but to also be able to automatically generate and fulfill a resulting policy.

BRIEF SUMMARY

The present disclosure includes, but is not limited to, a method, system and computer-usable medium for fulfilling modeled insurance coverage. In various embodiments, an insurance coverage modeler is implemented using a claim scenario generator to model the coverage of an insurance policy against a claim scenario. In these and other embodiments, coverage parameters and premiums of a current insurance policy are displayed within the user interface (UI) of a policy holder's information processing system.

A plurality of claim scenario parameters are then displayed within the insurance coverage modeler for selection. Once selected, the claim scenario parameters are used to select relevant claim data for the generation of a claim scenario. In one embodiment, the claim data is historical and is collected from actual events that have been documented. In another embodiment, the claim data is representative peer data. Once the claim scenario parameters have been applied to the selected data, a claim scenario is generated. The claim scenario is then applied to the policy coverage parameters of the current policy and coverage parameter disparities are determined.

Once coverage disparities have been identified, policy coverage parameters are then modified to offset any coverage parameter disparities. In various embodiments, policy coverage parameters are modified through the use of a user gesture within a graphical user interface (GUI). In one embodiment, coverage parameters are modified through user manipulation of a control of a graphical element representing the coverage parameter. As coverage parameters are modified, corresponding adjustments to the premium of the current policy are made and displayed within the UI. In one embodiment, a new policy is generated using the modified coverage parameters of the current policy and then fulfilled, electronically or physically.

BRIEF DESCRIPTION OF THE DRAWINGS

Selected embodiments of the disclosure may be understood, and its numerous objects and features obtained when the following detailed description is considered in conjunction with the following drawings, in which:

FIGS. 7a-c are a simplified illustration of an insurance coverage modeler as implemented to graphically display insurance coverage within a user interface window.

DETAILED DESCRIPTION

Figure 1:
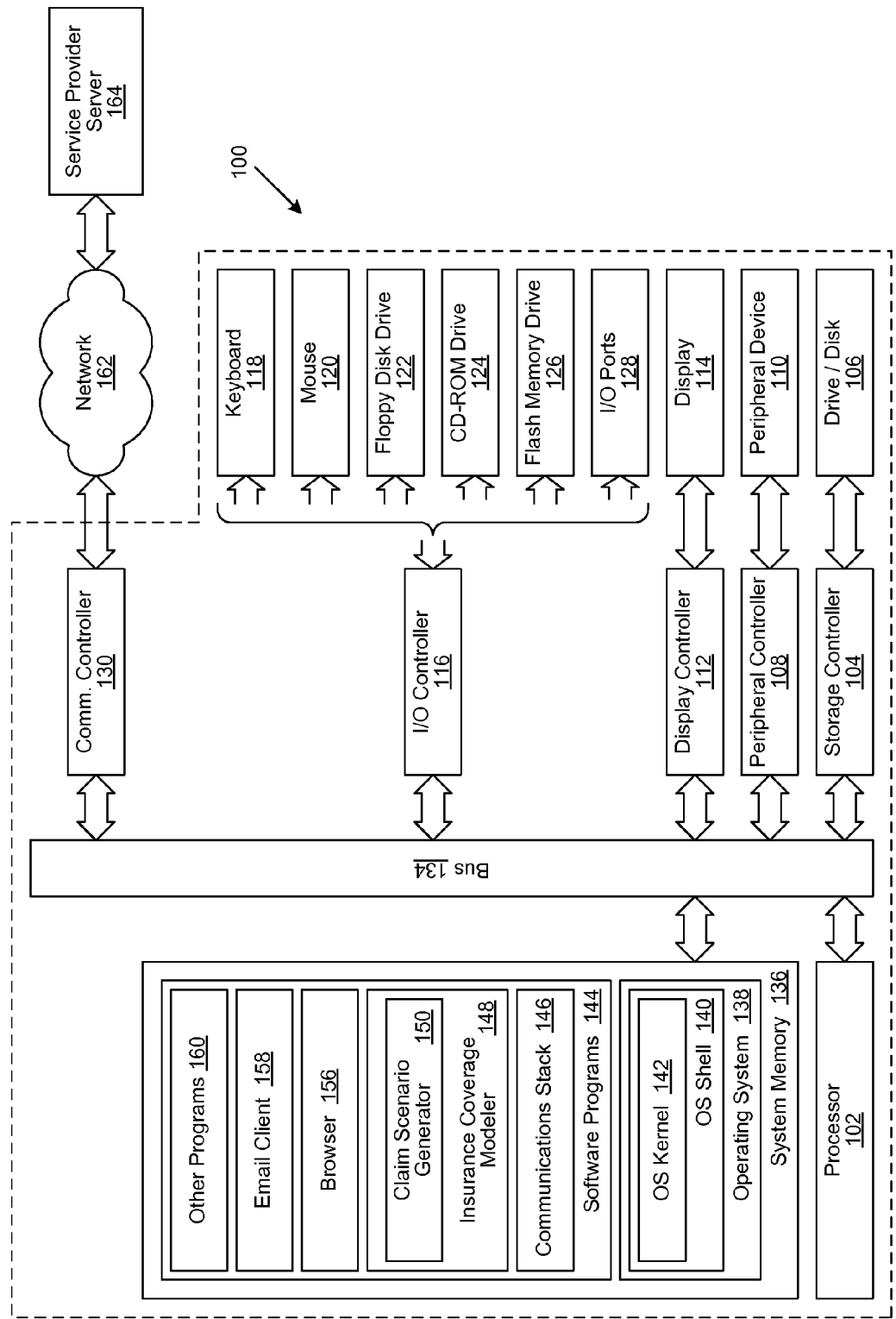
FIG. 1 is a simplified block diagram of an exemplary client information processing system (IPS) in which embodiments of the disclosure may be implemented.

A system, method, and computer-usable medium are disclosed for modeling insurance coverage. As will be appreciated by one skilled in the art, the disclosure may be embodied as a method, system, or computer program product. Accordingly, embodiments of may be implemented entirely in hardware, entirely in software (including firmware, resident software, micro-code, etc.), or in an embodiment combining software and hardware. These various embodiments may all generally be referred to herein as a "module" or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to one or more buses 134, along with peripheral controller 108, which controls one or more peripheral devices 110. An input/output (I/O) controller 116 provides communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include an insurance coverage modeler 148. The insurance coverage modeler 148 includes code for implementing the processes described in FIGS. 2-7 described hereinbelow. The insurance coverage modeler 148 further comprises claim scenario generator 150. In one embodiment, client IPS 100 is able to download insurance coverage modeler 148, and claim scenario generator 150 from a service provider server 164.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
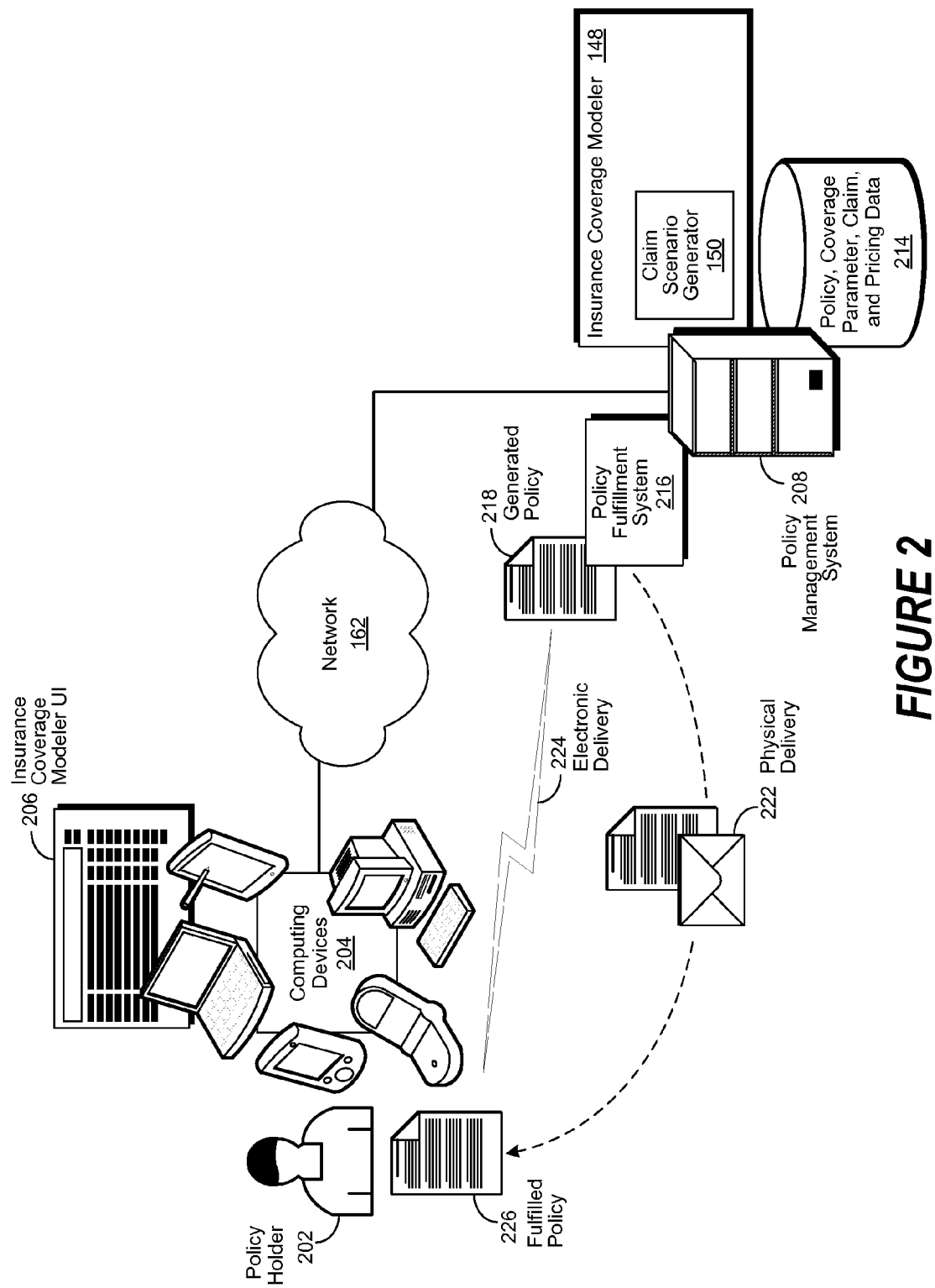
FIG. 2 is a simplified block diagram of an insurance coverage modeler as implemented for the modeling of insurance coverage.
Figure 3A:
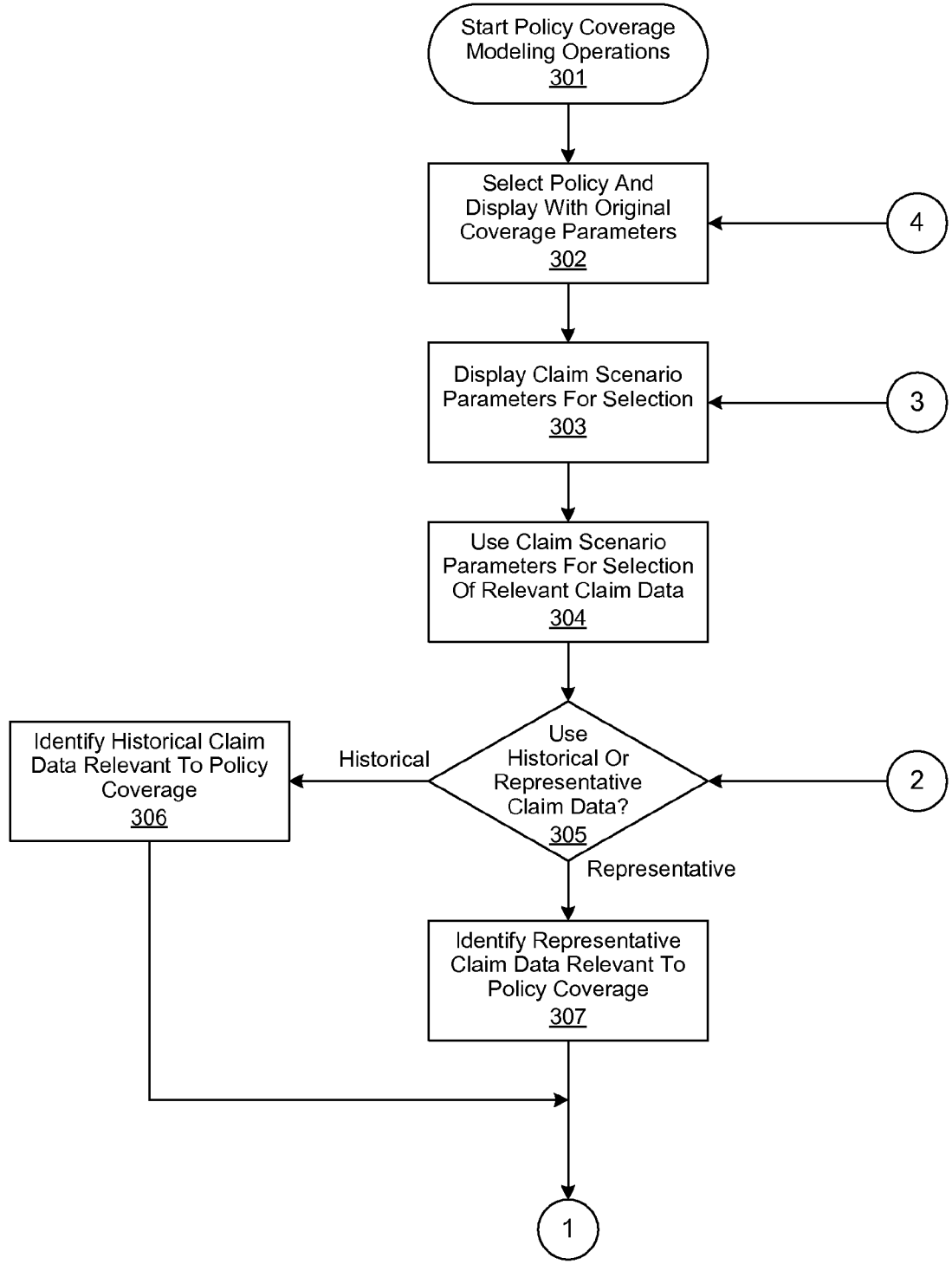
FIGS. 3a-e are a generalized flowchart of an insurance coverage modeler as implemented for the modeling of insurance coverage.
Figure 3B:
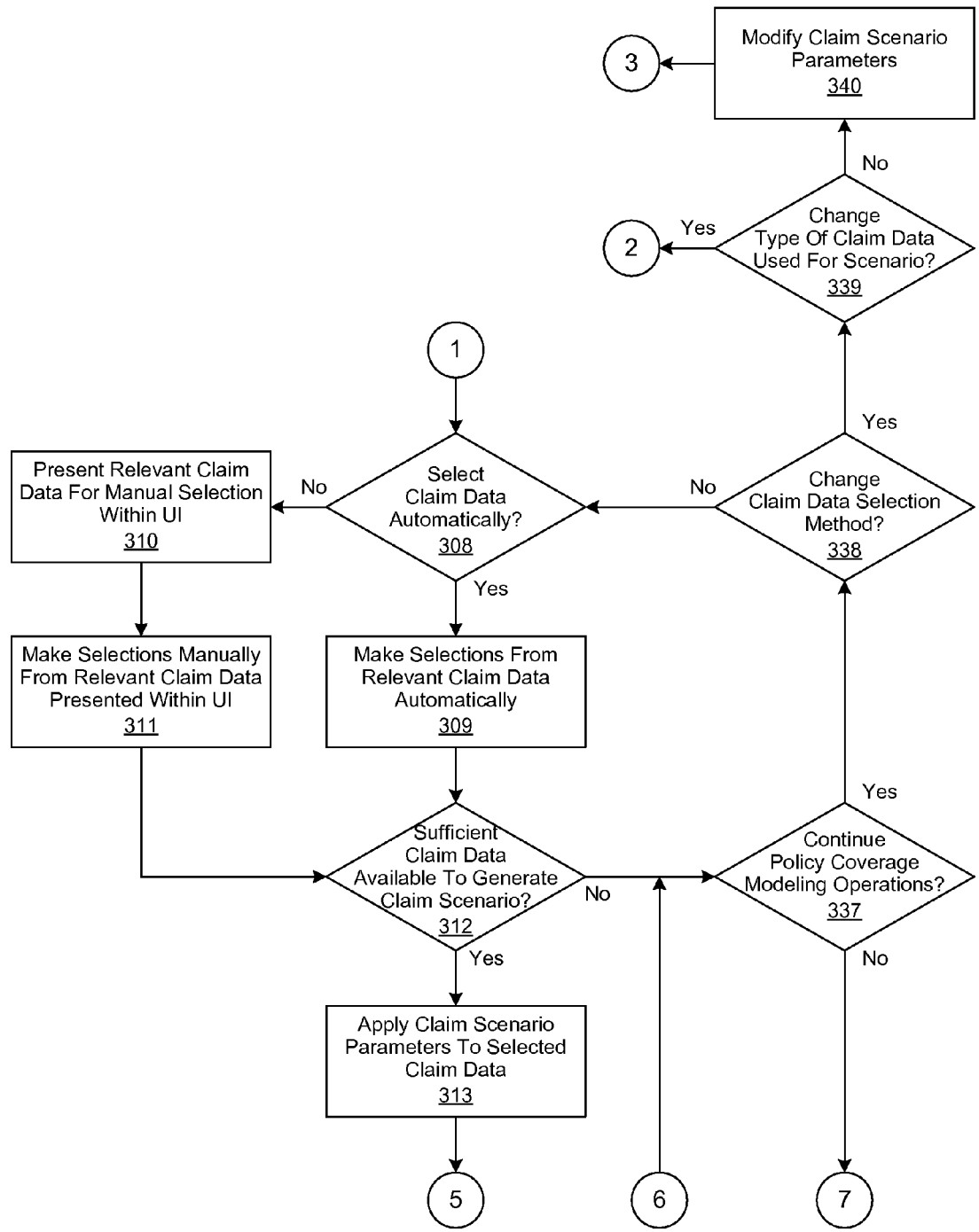
Figure 3C:
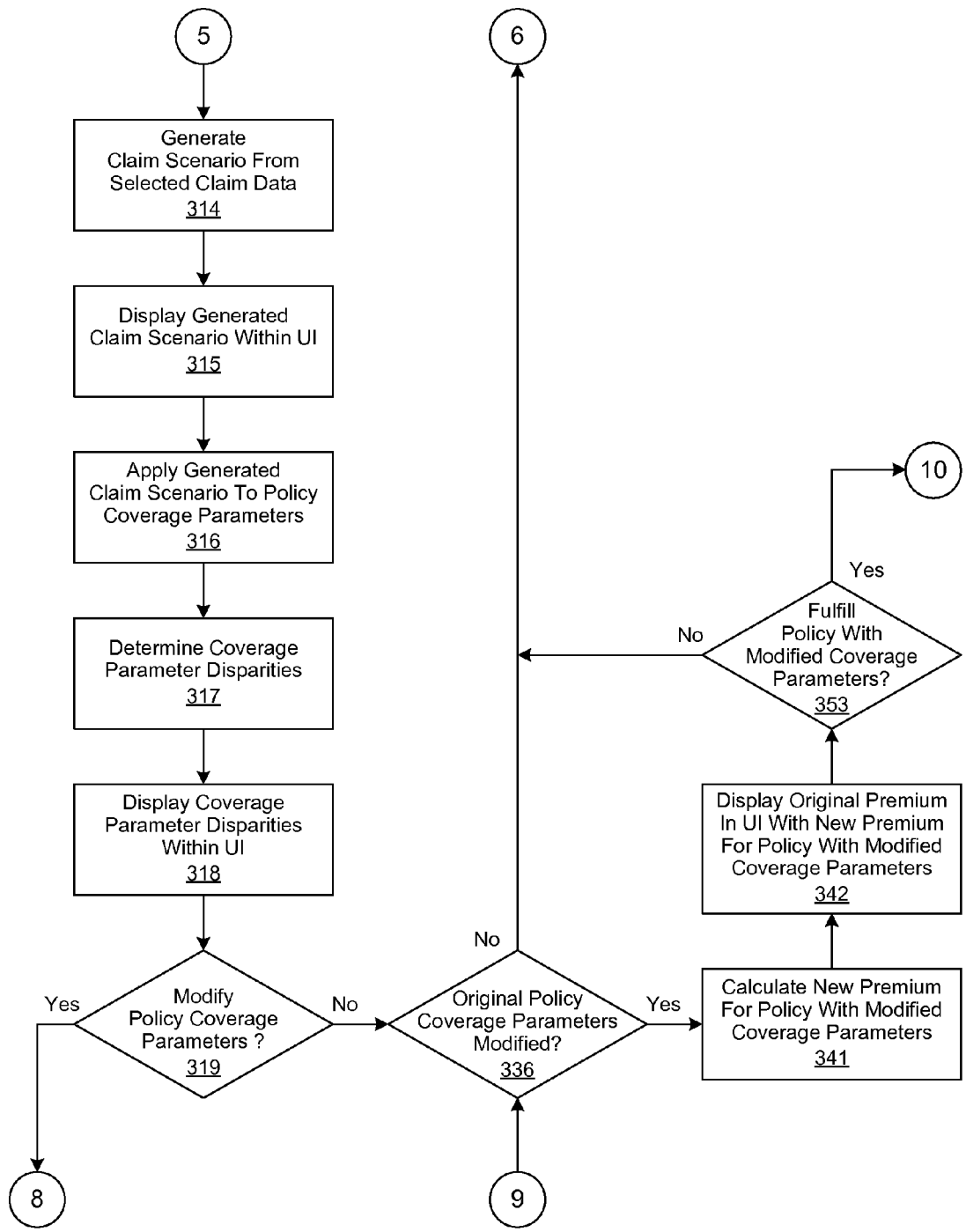
Figure 3D:
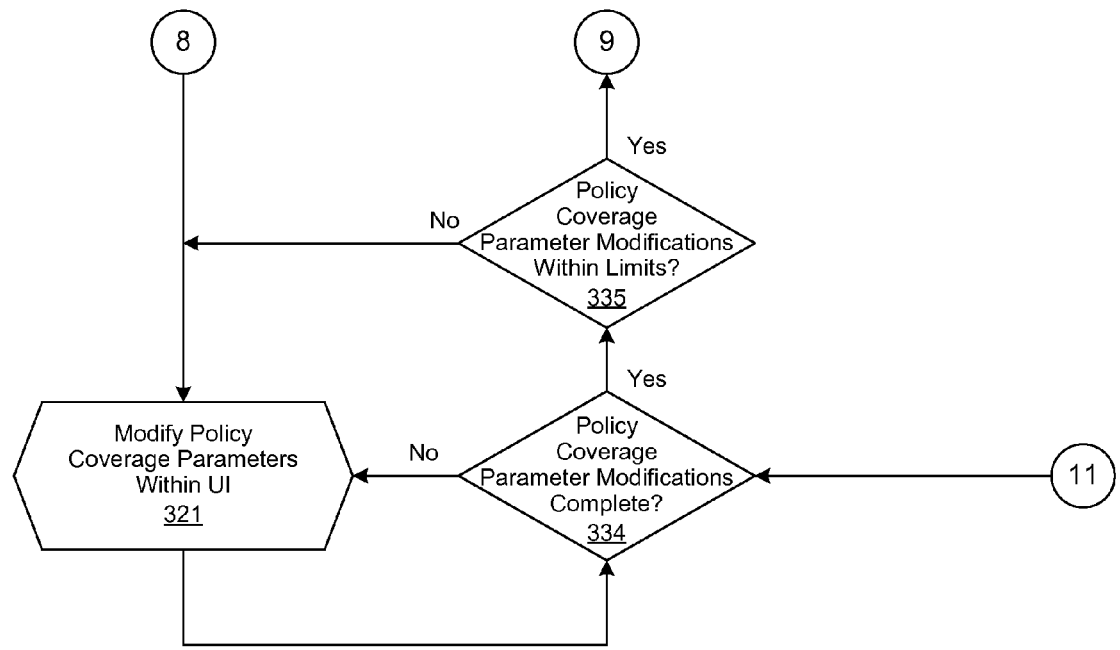
Figure 3E:
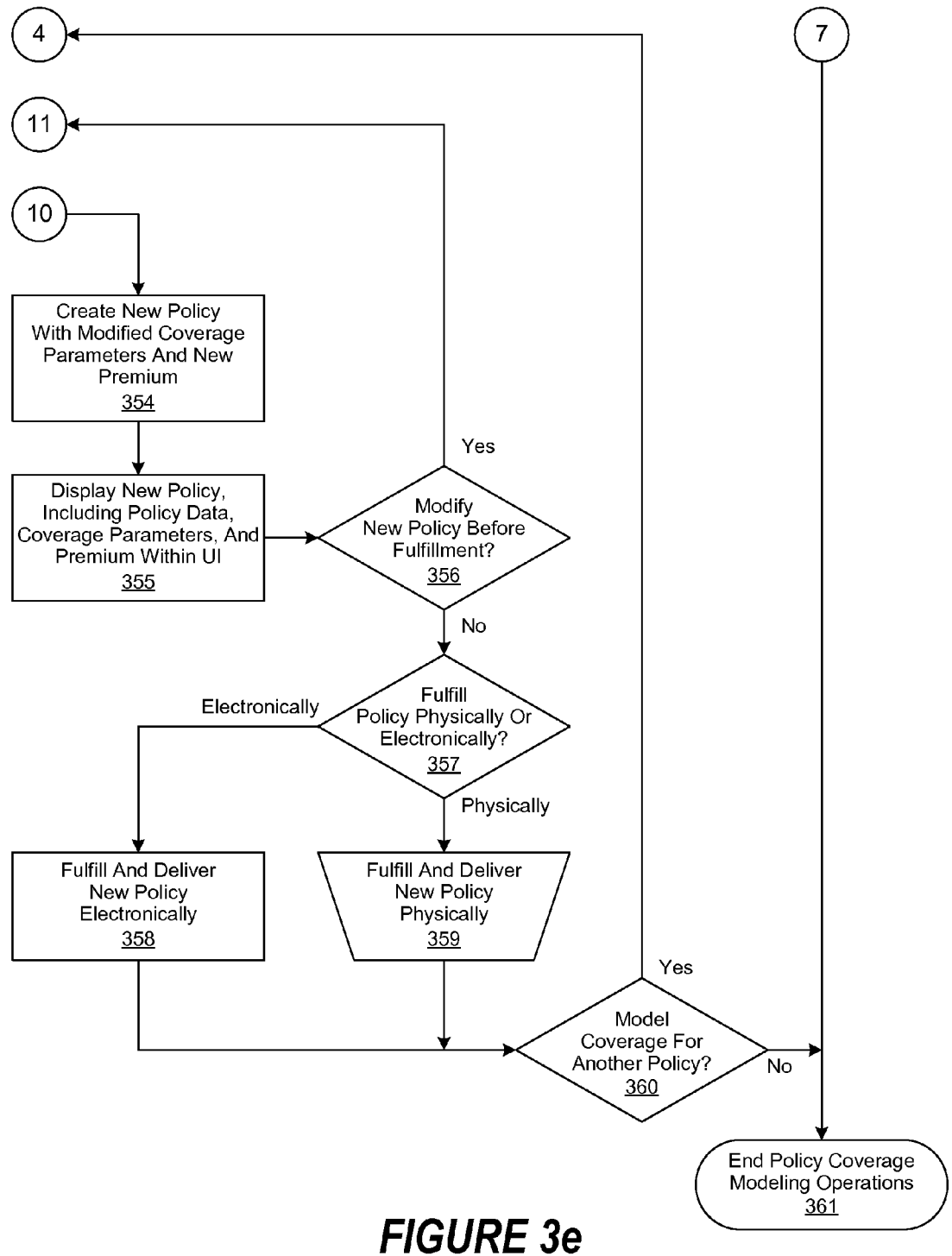

FIG. 2 is a simplified block diagram of an insurance coverage modeler as implemented in accordance with an embodiment of the disclosure. In various embodiments, an insurance coverage modeler 148 is implemented on policy management system 208 to model the coverage of an insurance policy against a claim scenario. The insurance coverage modeler 148 comprises a claim scenario generator 150. The policy management system 208 further comprises policy, coverage parameter, claim and pricing data 214, and policy fulfillment system 216.

Policy coverage modeling operations are begun by displaying coverage parameters and the premium of an insurance policy ("the current policy") within the insurance coverage modeler user interface (UI) 206 of a computing device 204 of policy holder 202. As used in various embodiments, the current policy is defined as a policy currently issued to a policy holder or a policy that is not currently issued, but being considered for issuance by a policy provider. In various embodiments, a policy holder computing device 204 may comprise a personal computer, a laptop computer, or a tablet computer. The policy holder computing device 204 may also comprise a personal digital assistant (PDA), a mobile telephone, or any other suitable device operable to display the insurance coverage user interface (UI) 206 and establish a connection with network 162.

In these and other embodiments, coverage parameters for the current policy are retrieved from a database 214, comprising policy, coverage parameter, claim and pricing data, and displayed within the insurance coverage user interface (UI) 206. As used herein, coverage parameters are coverage variables that define an insurer's obligation to pay for damages that are caused by a predetermined peril or group of perils. Once selected, the claim scenario parameters are then used to select relevant claim data from database 214 for the generation of a claim scenario. In one embodiment, the claim data is historical and is collected from actual events that have been documented. In another embodiment, the claim data is representative of peer claims. Once the claim parameters have been applied to the selected data, a claim scenario is generated by the claim scenario generator 150 of the insurance coverage modeler 148 as described in greater detail herein. The generated claim scenario is then displayed within the insurance coverage modeler UI 206.

The generated claim scenario is then applied to the policy coverage parameters of the current policy and coverage parameter disparities are determined. As used herein, a coverage parameter disparity is the difference between an element of a claim scenario and a corresponding coverage parameter of a policy. Once coverage parameter disparities have been determined, they are then displayed within the insurance coverage modeler UI 206. Afterwards, the policy coverage parameters can be modified within the insurance coverage modeler UI 206 and a new claim scenario generated. In various embodiments, policy coverage parameters are modified through the use of a user gesture within the insurance coverage modeler UI 206. In one embodiment, coverage parameters are modified through user manipulation of a control of a graphical element representing the coverage parameter within the insurance coverage modeler UI 206. As coverage parameters are modified, corresponding adjustments to the premium of the current policy are made and displayed within the UI.

In one embodiment, a new policy is generated using the modified coverage parameters of the current policy and then fulfilled, electronically or physically, by the policy fulfillment system 216 of the policy management system 208. In an embodiment, the generated policy 218 is generated in an electronic file format (e.g., portable document format (.pdf), Microsoft Word, etc.) and electronically delivered 224 to the policy holder's computing device 204 over a connection to the network 162. Upon delivery, the generated policy 218 becomes a fulfilled policy 226. In another embodiment, the generated policy 218 is generated in a printed format and physically delivered 222 to the policy holder 202. As before, the generated policy 218 becomes a fulfilled policy 226 upon delivery.

FIGS. 3*a-e* are a generalized flowchart of an insurance coverage modeler as implemented in accordance with an embodiment of the disclosure for fulfilling modeled insurance coverage. In various embodiments, an insurance coverage modeler is implemented to model the coverage of an insurance policy against a claim scenario. In this embodiment, policy coverage modeling operations are begun in step 301, followed by the selection of an insurance policy ("the current policy"), which is then displayed with its coverage parameters and premium within a user interface (UI) in step 302. As used herein, coverage parameters are coverage variables that define an insurer's obligation to pay for damages that are caused by a predetermined peril or group of perils. The obligation typically has corresponding financial limits and deductibles that circumscribe the insurer's responsibility for losses against that coverage. In various embodiments, coverage parameters may include the total coverage available for purchase to cover a predetermined peril (e.g., bodily harm, property damage, etc.). Coverage parameters may also include current coverage of an insurance policy, minimum and maximum limits of the coverage, deductibles, elective coverage options, and contractual terms associated with insurance coverages. As used in various embodiments, the current policy is defined as a policy currently issued to a policy holder or a policy that is not currently issued, but being considered for issuance by a policy provider.

In step 303, a plurality of claim scenario parameters are displayed within the UI for selection by the user. As used herein, claim scenario parameters are variables that define one or more claims against an insurance policy. In one embodiment, claim scenario parameters include a policy type (e.g., automobile, household, commercial, etc.), an accident type (multi-vehicle, weather, etc.), and a severity level (e.g., minor, moderate, severe, etc.). In other embodiments, a severity level claim scenario parameter is combined with other claim scenario parameters to further define the claim scenario. Examples of other claim scenario parameters for an automobile accident may include moderate damage to the insured vehicle and other vehicles, minor injuries to the insured, severe injuries to others, and moderate collateral damage. It will be appreciated that many such coverage parameters may be used to define a claim scenario and the foregoing examples are not intended to be limiting and are provided for illustrative purposes only.

Once selected, the claim scenario parameters are then used in step 304 to select relevant claim data for the generation of a claim scenario. In one embodiment, the claim data is historical and is collected from actual events that have been documented. In another embodiment, the claim data is representative peer data corresponding to a peer group having financial parameters similar to the policy holder. As another example, claim data may be based on actuarial models that predict anticipated costs to settle individual elements of a claim. For instance, the representative peer claim data may incorporate forecasted injury settlements for drivers combined with average repair costs for certain classes of automobiles.

Accordingly, a decision is made in step 305 whether to use historical or representative peer claim data for the generation of the claim scenario. If it is decided in step 305 to use historical claim data, then relevant historical claim data is identified in step 306. As an example of claim data relevancy, if the user's policy is for automobile coverage, then household or commercial property claim data is not considered relevant. Similarly, if the claim scenario parameters are limited to moderate vehicular damage, then minor or severe vehicular claim data is not considered relevant. Conversely, claim data for moderate injuries to the insured, but minor or severe injuries to others may be considered relevant.

In one embodiment, historical claim data is considered relevant only if the claim data is associated with a single claim and matches all of the selected claim scenario parameters. In another embodiment, individual elements of historical claim data are considered relevant even if they are associated with different claims. It will be apparent to those of skill in the art that a composite set of claim data elements derived from a plurality of claims provides additional flexibility in the generation of claim scenarios matching selected claim scenario parameters. However, if it is decided in step 305 that representative peer claim data is to be used for the generation of a claim scenario, then relevant representative peer claim data is identified in step 307. In one embodiment, representative peer claim data may be an average of historical claim data elements derived from a plurality of historical claims. In another embodiment, historical claim data elements may be used in conjunction with actuarial approaches familiar to those of skill in the art to predict the cost to settle individual elements of a claim scenario. These predicted costs can then be used as representative peer claim data in the generation of a claim scenario.

Once the relevant claim data for the claim scenario has been identified, a decision is made in step 308 whether the claim data to be used in the claim scenario is to be selected automatically. If it is not, then the relevant claim data is provided in step 310 for manual selection within the UI. Once provided, the user manually selects the claim data in step 311 that they wish to be used in the generation of the claim scenario. As an example, the user may desire to select relevant claim data that is associated with a geographic region, such as the Northeast. As another example, the user may elect to choose claim data involving minor damage to multiple vehicles as opposed to extensive damage to a single, expensive vehicle. It will be appreciated that many such choices are possible and the foregoing are provided for illustrative purposes only and are in no way intended to be limiting. However, if it is decided in step 308 that the claim data is to be automatically selected, then selections are automatically made in step 309 by the insurance coverage modeler from the identified relevant claim data. As an example, in one embodiment, an algorithm is applied to relevant historical data to statistically determine the optimum selection of claim data.

Once the relevant claim data has been selected, whether automatically by the insurance coverage modeler or manually by the user, a test is conducted in step 312 to determine whether sufficient claim data has been selected to generate a claim scenario. If so, then a decision is made in step 337 whether to continue insurance policy modeling operations. If not, then insurance policy coverage modeling operations are ended in step 361. Otherwise, a decision is made in step 338 whether to change the method of claim data selection. If it is decided in step 338 that the method of claim data selection is to be changed, then the process continues, proceeding to step 308. Otherwise, a decision is made in step 339 whether to change the type of claim data for generation of the claim scenario. If so, then the process continues, proceeding to step 305. However, if it is decided in step 339 to not change the type of claim data, then the claim scenario parameters are modified in step 340 and the process is continued, proceeding to step 303.

If it is decided in step 312 that sufficient claim data is available to generate a claim scenario, then the claim scenario parameters are applied to the selected claim data in step 313. Once the claim parameters have been applied to the selected data, a claim scenario is generated in step 314 by the claim scenario generator module of the insurance coverage modeler described in greater detail herein. The generated claim scenario is then displayed within the UI in step 315. In one embodiment, a summary of the claim scenario is displayed within the UI. In yet another embodiment, both the summary and claim details of the generated claim scenario are displayed within the UI.

The generated claim scenario is then applied to the policy coverage parameters of the current policy in step 316 and coverage parameter disparities are decided in step 317. As used herein, a coverage parameter disparity is the difference between an element of a claim scenario and a corresponding coverage parameter of a policy.

Once coverage parameter disparities have been determined, they are then displayed within the UI in step 318. A decision is then made in step 319 whether to modify policy coverage parameters for the current policy. For example, the chosen coverage parameters may have been set too low, with the result that negative coverage parameter disparities were determined and displayed within the UI. If it is decided in step 319 that the policy coverage parameters are to be modified, then modifications to the policy coverage parameters are made within the UI in step 321. Once it is decided in step 334 that policy coverage modifications are complete, then a decision is made in step 335 whether the modifications to the policy coverage parameters are within predetermined limits. If not, then the process continues, proceeding to step 321. Otherwise, processing proceeds to step 336, where a decision is made regarding whether modifications have been made to the original coverage parameters of the current policy. If it is decided that no modifications have been made to the original coverage parameters of the current policy, then the process continues, proceeding to step 337. Otherwise, a new premium is calculated in step 341 using the modified policy coverage parameters and predetermined pricing data. Once calculated, the original premium is displayed within the UI in step 342 along with the new premium calculated in step 341.

A decision is then made in step 353 whether to fulfill the current policy with its modified coverage parameters and modified premium. If not, then the process continues, proceeding to step 337, where a decision is made whether to continue policy coverage modeling operations. Otherwise, a new policy is generated in step 354 that comprises predetermined policy data combined with the modified coverage parameters and modified premium of the current policy. Once generated, the new policy, along with its corresponding policy data, coverage parameters and premium, is displayed within the UI in step 355.

A decision is then made in step 356 about whether to modify the new policy prior to its fulfillment. If so, then the process continues, proceeding to step 334. Otherwise, a decision is made in step 357 regarding whether the new policy will be fulfilled electronically or physically. If it is decided in step 357 to fulfill the new policy electronically, then it is fulfilled electronically in step 358. However, if it is decided in step 357 to fulfill the new policy physically, then it is fulfilled physically in step 359. In one embodiment, the new policy is generated in a printed format and physically delivered, such as through a postal or delivery service, to the user. Regardless of whether the new policy was fulfilled and delivered electronically or physically, a decision is made in step 360 whether to model coverage for another policy. If so, then the process continues, proceeding with step 302, where the user's current policy is displayed within the UI. Otherwise, insurance policy coverage modeling operations are ended in step 361.

Figure 4:
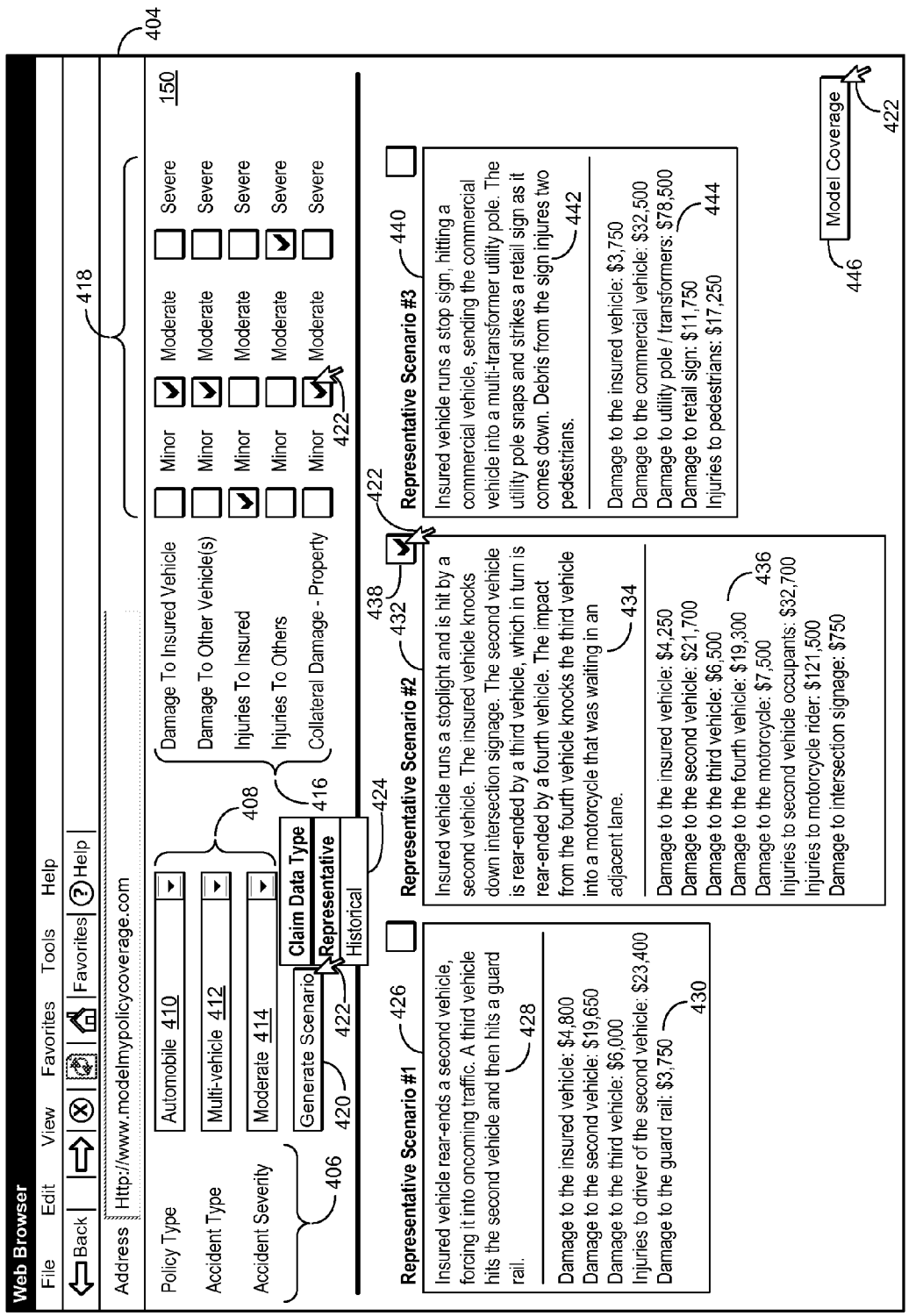
FIG. 4 is a simplified illustration of a claim scenario generated within a user interface window from representative peer claim data.

FIG. 4 is a simplified illustration of a claim scenario generated within a user interface window from representative peer claim data in accordance with an embodiment of the disclosure. In this embodiment, a claim scenario generator 150 is implemented within user interface (UI) window 404 and comprises claim scenario parameters 406 and 416. As used herein, claim scenario parameters are variables that define one or more claims against an insurance policy. In one embodiment, claim scenario parameters 406 include graphical elements such as drop-down menus 408. As an example, the selected Policy Type claim scenario parameter is "automobile" 410. Similarly, the selected Accident Type and Accident Severity claim scenario parameters are respectively "multi-vehicle" 412 and "moderate" 414. In a similar fashion, claim scenario parameters 416 include graphical elements such as check boxes 418, which are selected through a user gesture, such as a mouse click with cursor 422. As an example, the selected Damage To Insured Vehicle claim scenario parameter is "moderate," while the selected Injuries To Others claim scenario parameter is "severe."

Once selected, the claim scenario parameters are then used to select relevant claim data for the generation of a claim scenario. In various embodiments, the claim data may be either representative peer claim data or historical claim data. For example, claim data may be an average of historical claim data that matches the claim scenario defined by the selected claim scenario parameters. As another example, claim data may be based on actuarial models that predict anticipated costs to settle individual elements of a claim.

In one embodiment, the type of claim data is selected through a user gesture, such as placing cursor 422 over the Generate Scenario command button 420, followed by a right-mouse-click to open claim data type menu 424. In this embodiment, claim data is selected within the claim data type menu 424 through a user gesture such as a left-mouse-click with cursor 422. The Generate Scenario command button 420 is then selected, likewise with a user gesture such as a left-mouse-click with cursor 422, to generate representative peer claim scenarios '#1' 426, '#2' 432, and '#3' 440. In this same embodiment, representative peer claim scenario '#1' 426 comprises a summary section 428 and a detail section 430. Representative peer claim scenarios '#1' 426 and '#2' 432 similarly comprise summary sections 434, 436 and detail sections 436, 444 respectively. Once representative peer claim scenarios '#1' 426, '#2' 432, and '#3' 440 are displayed, the user selects the representative peer claim scenario (e.g., '#2' 432) they wish to have applied to the coverage parameters of the current policy. In one embodiment, the representative peer claim scenario is selected through a user gesture, such as by placing cursor 422 over checkbox 438, followed by a left-mouse-click. Once the representative peer claim scenario has been selected, the Model Coverage command button 446 is activated with a user gesture, such as by using cursor 422 followed by a left-mouse click. Once activated, the selected representative peer claim scenario is applied to the coverage parameters of the current policy as described in greater detail herein.

Figure 5:
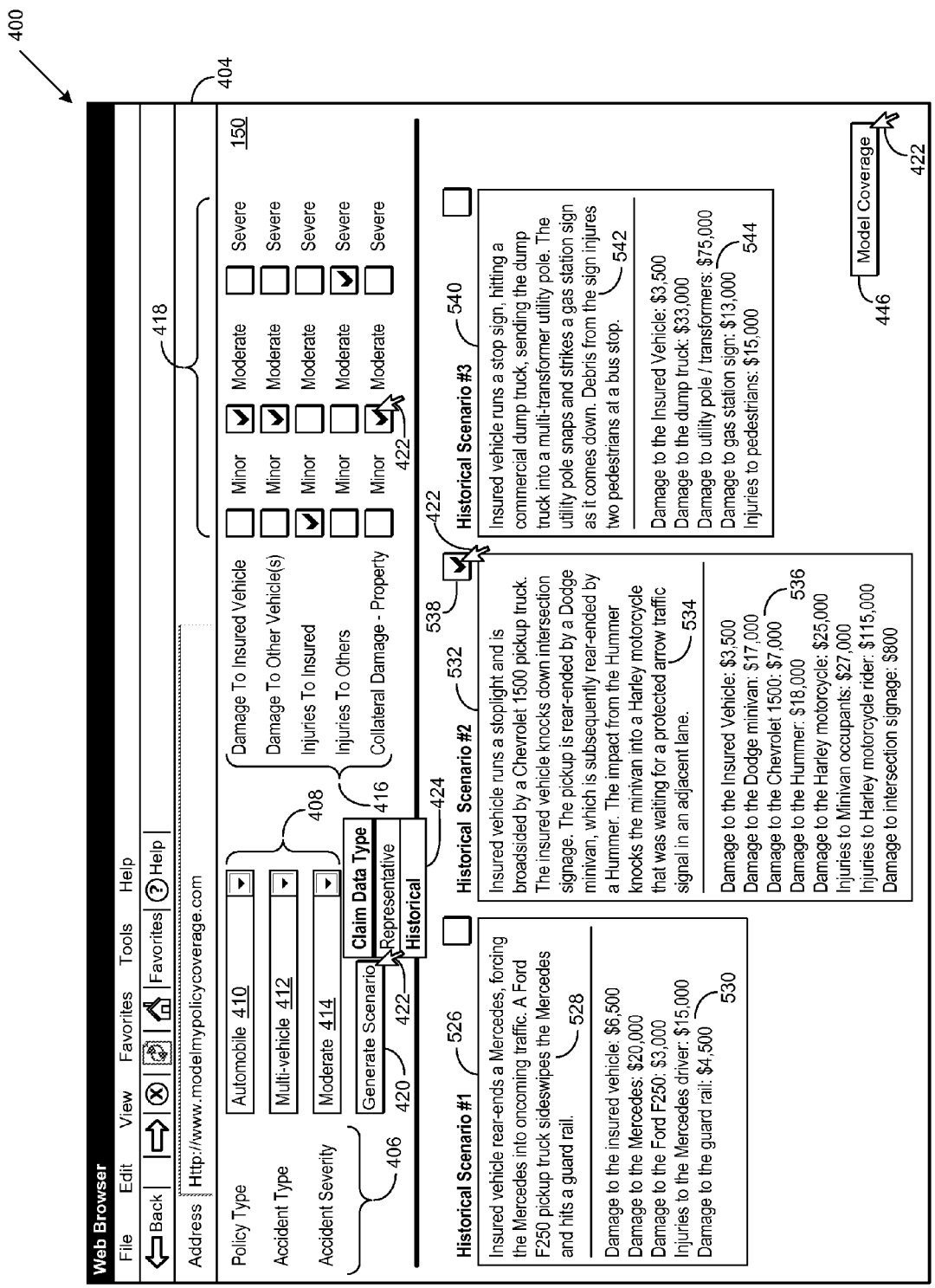
FIG. 5 is a simplified illustration of a claim scenario generated within a user interface window from historical claim.

FIG. 5 is a simplified illustration of a claim scenario generated within a user interface window from historical claim data in accordance with an embodiment of the disclosure. In this embodiment, a claim scenario generator 150 is implemented within user interface (UI) window 404 and comprises claim scenario parameters 406 and 416 as described in greater detail herein. In one embodiment, claim scenario parameters 406 include graphical elements such as drop-down menus 408. As an example, the selected Policy Type claim scenario parameter is "automobile" 410. Similarly, the selected claim scenario parameters for Accident Type and Accident Severity are respectively "multi-vehicle" 412 and "moderate" 414. In a similar fashion, claim scenario parameters 416 include graphical elements such as check boxes 418, which are selected through a user gesture, such as a mouse click with cursor 422. As an example, the claim scenario parameter for Damage To Insured Vehicle has been selected to be "moderate," while the claim scenario parameter for Injuries To Others has been selected to be "severe."

Once selected, the claim scenario parameters are then used to select relevant claim data for the generation of a claim scenario. In this embodiment, the claim data is historical and is collected from actual events that have been documented. In one embodiment, the type of claim data is selected through a user gesture, such as placing cursor 422 over the Generate Scenario command button 420, followed by a right-mouse-click to open claim data type menu 424. In this embodiment, "historical" claim data is selected within the claim data type menu 424 through a user gesture such as a left-mouse-click with cursor 422. The Generate Scenario command button 420 is then selected, likewise with a user gesture such as a left-mouse-click with cursor 422 to generate historical scenarios '#1' 526, '#2' 532, and '#3' 540. In this same embodiment, representative peer claim scenario '#1' 526 comprises a summary section 528 and a detail section 530. Representative peer claim scenarios '#1' 526 and '#2' 532 similarly comprise summary sections 534, 536 and detail sections 536, 544 respectively. Once representative peer claim scenarios '#1' 526, '#2' 532, and '#3' 540 are displayed, the user selects the representative peer claim scenario (e.g., '#2' 532) they wish to have applied to the coverage parameters of the current policy. In one embodiment, the representative peer claim scenario is selected through a user gesture, such as by placing cursor 422 over checkbox 538, followed by a left-mouse-click. Once the representative peer claim scenario has been selected, the Model Coverage command button 446 is activated with a user gesture, such as by using cursor 422 followed by a left-mouse click. Once activated, the selected representative peer claim scenario is applied to the coverage parameters of the current policy as described in greater detail herein.

Figure 6:
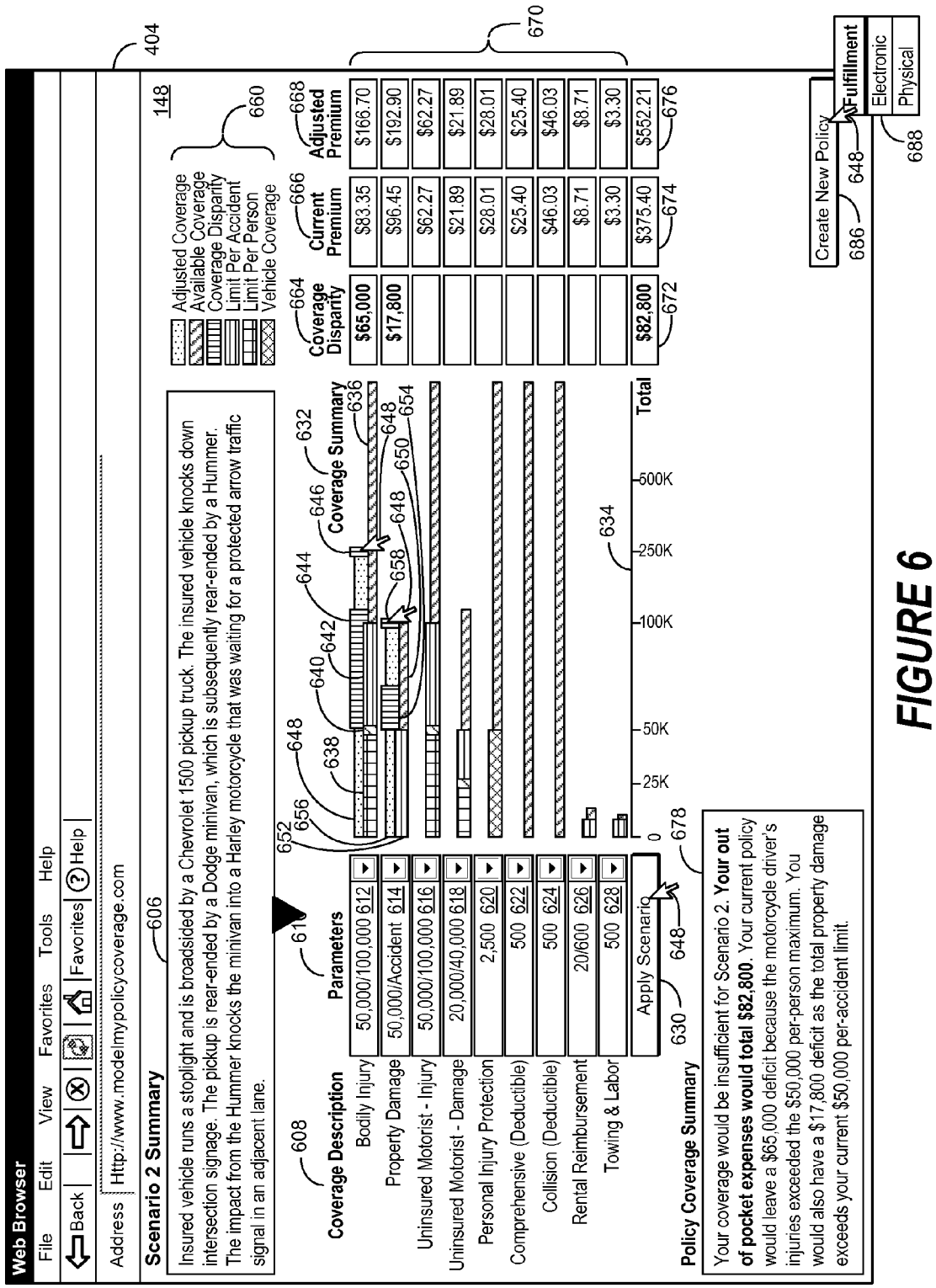
FIG. 6 is a simplified illustration of an insurance coverage modeler as implemented within a user interface window.

FIG. 6 is a simplified illustration of an insurance coverage modeler as implemented within a user interface window in accordance with an embodiment of the disclosure. In this embodiment, insurance coverage modeler 148 is implemented within user interface (UI) window 404 and comprises a Claim Scenario Summary window 606 and a Policy Coverage Summary window 678. The insurance coverage modeler 150 likewise comprises a plurality of coverage parameter descriptions 608, corresponding to their respective coverage parameters 610 for the current policy.

As illustrated in FIG. 6, the Bodily Injury coverage parameters 612 are indicated to be $50,000 per person and $100,000 per accident. Similarly, the Property Damage coverage parameters 614 are indicated to be a total of $50,000 per accident. In a like fashion, the Uninsured Motorist—Injury coverage parameters 616 are indicated to be $50,000 per person and $100,000 per accident, while the Uninsured Motorist—Damage coverage parameters 618 are indicated to be $20,000 per person and $40,000 per accident. The Personal Injury Protection coverage parameters 620 are similarly indicated to be a total of $2,500 per accident. However, the Comprehensive and Collision coverage parameters 622 and 624 are indicated to be limited, not to their respective amounts of coverage, but to policy holder deductible costs of $500 each. The Rental Reimbursement coverage parameters for 626 are also similarly indicated to be limited to $20 per day and a maximum coverage of $600, while the Towing And Labor coverage parameters 628 are indicated to be limited to $500.

Claim Scenario #2, generated from historical claim data as illustrated in greater detail in FIG. 5, is summarized in the Claim Scenario Summary window 606. In one embodiment, Claim Scenario #2 is applied to coverage parameters 610 in response to a user gesture, such as placing cursor 648 over the Apply Scenario command button 630, followed by a left-mouse-click. As a result, line items 670 for coverage parameter disparities 664 and current premiums 666, corresponding to coverage parameters 612 and 614 respectively, are displayed along with total coverage parameter disparities 672 and total current premium 674. Subsequently, the contents of Policy Coverage Summary window 678 are displayed, which provide a summary explanation of coverage parameter disparities for coverage parameters 612 and 614.

As used herein, a coverage parameter disparity is the difference between an element of a claim scenario and a corresponding coverage parameter of a policy. As an example, the current policy illustrated in FIG. 6 has a coverage parameter 612 of $50,000 per person for bodily injury incurred in an automobile accident. However, the policy also has a coverage parameter 612 of $100,000 total for bodily injuries sustained within a single accident. If a person involved in an automobile accident incurs $115,000 in bodily injuries, then there is a $65,000 coverage parameter disparity. This is due to the fact that while the insured is covered for bodily injuries totaling $100,000 in the accident, there is only $50,000 of coverage for each injured individual, hence the $65,000 deficit, which equates to the afore-referenced coverage parameter disparity. As another example, the current policy has a property damage coverage parameter 614 of $50,000 per accident. Total property damages for Scenario #2 are $67,800, which represents a coverage parameter disparity of $17,800.

In various embodiments, coverage parameter disparities are addressed by modifying coverage parameters 610 and reapplying a claim scenario, such as Claim Scenario #2 described in greater detail herein. In various embodiments, policy coverage parameters are modified through the use of a user gesture within a graphical user interface (GUI). In one embodiment, a mouse cursor 648 is used to select a coverage parameter 610 from a drop-down menu. As an example, the drop-down menu for the Property Damage coverage parameter 614 may have selections that include "$50,000", "100,000", "$250,000", "500,000", and "$1,000,000", which are selected according to the amount of coverage the user desires. In another embodiment, a mouse cursor is used to select a check box widget within the GUI corresponding to a coverage parameter selection. As an example, a Property Damage coverage parameter may have coverage selections that include "$50,000", "100,000", "$250,000", "500,000", and "$1,000,000", each of which has a corresponding check box widget.

In yet another embodiment, coverage parameters are displayed as graphical elements of a coverage summary 632 within the UI window 404. Subsequent to being displayed, the coverage parameters are then modified through user manipulation of a control of a graphical element representing the coverage parameter. As additionally illustrated in FIG. 6, the UI window 404 comprises a visual attribute legend 660, which is implemented in various embodiments to differentiate the graphical representation of different coverage parameters from each other. As illustrated in FIG. 6, coverage summary 632 comprises indicator bar 636, which graphically indicates via pricing scale 634 the total amount of coverage available for the Bodily Injury coverage parameter 612. Similarly, indicator bar 638 graphically represents the original $50,000 per-person, and indicator bar 642 the original $100,000 total per-accident, coverage parameter 612 for bodily injury. Graphical element 640 serves to graphically demarcate the difference between the per-person coverage parameter of $50,000 from the $100,000 total per-accident coverage parameter. Indicator bar 644 graphically represents a coverage parameter disparity resulting from applying claim scenario #2 against the bodily injury coverage parameter 612.

Indicator bar 648, having a slider 646, represents a modified value of the Bodily Injury coverage parameter 612. The user selects the slider 646 of the modified coverage indicator bar 648, such as by using a mouse click-and-hold operation, and then drags the slider 646 to modify the value of the original Bodily Injury coverage parameter 612. As the user drags the slider 646, the length of the modified coverage indicator bar 648 changes and a corresponding change is reflected in the value of the Bodily Injury coverage parameter 612.

As similarly illustrated in FIG. 6, indicator bar 650 graphically indicates via pricing scale 634 the total amount of coverage available for Property Damage coverage parameter 612. In a similar fashion, indicator bar 652 graphically represents the original $50,000 total per-accident, coverage parameter 614 for property damage. Indicator bar 654 graphically represents a coverage parameter disparity resulting from applying claim scenario #2 against the Bodily Injury coverage parameter 614.

Indicator bar 656, having a slider 658, represents a modified value of the Property Damage coverage parameter 614. The user selects the slider 658 of the modified coverage indicator bar 656, using a mouse click-and-drag operation, and then drags the slider 658 to modify the value of the original Property Damage coverage parameter 614. As the user drags the slider 656, the length of the modified coverage indicator bar 656 changes, and a corresponding change is reflected in the value of the Property Damage coverage parameter 614.

If modifications have been made to the original coverage parameters 610 of the current policy, then adjusted premiums 668 for the modified coverage parameters 610 are calculated. Once calculated, the current premiums 666 and adjusted premiums 668, comprising line item 670 premiums for each of the coverage parameters, are displayed within the UI window 404 along with total current premium 674 and the total adjusted premium 676.

In various embodiments, a new policy is generated from the modified coverage parameters and their associated premiums. In one embodiment, such a new policy is generated as a result of a user gesture, such as selecting the Create New Policy command button 686 with cursor 648, followed by a left-mouse click. In this embodiment, the new policy can be fulfilled either electronically or physically. If a decision is made to fulfill the new policy electronically, then a user gesture, such as placing cursor 648 over the Create New Policy command button 686, followed by a right-mouse click, will result in the display of a Policy Fulfillment menu 688.

Upon selection of the "electronic" menu option, the new policy is generated in an electronic file format (e.g., portable document format (.pdf), Microsoft Word, etc.) and delivered to the user over a connection to a network, such as the public Internet. In another embodiment, the new policy is generated in an electronic file format operable to be delivered as a FAX message over a network. In this embodiment, the electronic version of the new policy is received in a physical form, such as a printed document produced by a FAX machine, by the user. However, if the new policy is to be fulfilled physically, then the "physical" menu option is selected and the new policy is generated in a printed format and physically delivered, such as through a postal or delivery service, to the user.

FIGS. 7a-c are a simplified illustration of an insurance coverage modeler as implemented to graphically display insurance coverage within a user interface window. As described in greater detail herein, coverage parameters are displayed in various embodiments as graphical elements within a user interface (UI) window. In certain of these embodiments, coverage parameters are modified through user manipulation of a control of the graphical element representing a coverage parameter.

As illustrated in FIGS. 7a-c, via its proximate location to pricing scale 708, indicator bar 710 graphically indicates the total amount of coverage available for Bodily Injury coverage parameters 702, 704, and 706. Similarly, indicator bar 712 graphically represents an original $50,000 per-person, and indicator bar 716 an original $100,000 total per-accident, bodily injury coverage parameters 702 for a policy. Graphical element 714 serves to graphically demarcate the difference between the per-person coverage parameter of $50,000 from the $100,000 total per-accident coverage parameter. Indicator bar 718 graphically represents a current coverage parameter disparity resulting from applying a claim scenario, such as Claim Scenario #2 described and illustrated in greater detail in FIG. 5, against the bodily injury coverage parameter 612.

As used herein, a coverage parameter disparity is the difference between an element of a claim scenario and a corresponding coverage parameter of a policy. Using the original coverage parameters 702 as an example, the coverage parameters are $50,000 per-person, $100,000 total, per-accident for bodily injuries incurred in an automobile accident. If a person involved in an automobile accident incurs $115,000 in bodily injuries, then there is a $65,000 coverage parameter disparity. This is due to the fact that while the insured is covered for bodily injuries totaling $100,000 in the accident, there is only $50,000 of coverage for each injured individual, hence the $65,000 deficit, which equates to the afore-referenced coverage parameter disparity. Accordingly, the amount of the $65,000 current coverage disparity is displayed in the Current Coverage Disparity window 728. Concurrently, the amount of the current premium for Bodily Injury coverage parameters 702, which is $83.35, is similarly displayed in the Current Premium window 734. In various embodiments, coverage parameter disparities are addressed by modifying original coverage parameters 702 and reapplying a claim scenario, such as Claim Scenario #2 described in greater detail herein.

Referring now to FIG. 7b, indicator bar 722, having a slider 724, graphically represents modified bodily injury coverage parameters 704. In one embodiment, the user selects the slider 724 of indicator bar 722, such as by using a mouse click-and-hold operation with cursor 726, and then drags the slider 724 to modify the value of the original Bodily Injury coverage parameters 702. As the user drags the slider 724, the length of the modified coverage indicator bar 722 changes, and a corresponding change is reflected in the value of the Bodily Injury coverage parameter 704. As a result, the original Bodily Injury coverage parameters 702 are modified to a value of $125,000 per-person and $250,000 total per-accident, which are then displayed as modified Bodily Injury coverage parameters 704. Concurrently, a positive adjusted coverage parameter disparity of $10,000 is displayed in the Disparity After Adjustment window 732. In addition, an adjusted premium cost of $166.70 for the modified coverage parameters is displayed in the Adjusted Premium window 738.

Referring now to FIG. 7c, the user drags the slider 724 to modify the value of the original Bodily Injury coverage parameters 702 as described and illustrated in FIG. 7c. As the user drags the slider 724, the length of the modified coverage indicator bar 722 changes, and a corresponding change is reflected in the value of the Bodily Injury coverage parameter 704. As a result, the original Bodily Injury coverage parameters 702 are modified to a value of $250,000 per-person and $500,000 total per-accident, which are then displayed as modified Bodily Injury coverage parameters 706. Concurrently, a positive adjusted coverage parameter disparity of $135,000 is displayed in the Disparity After Adjustment window 732. In addition, an adjusted premium cost of $333.40 for the modified coverage parameters is displayed in the Adjusted Premium window 738. Accordingly, the positive adjusted coverage parameter disparity of $135,000 displayed in the Disparity After Adjustment window 732 may be considered excessive by a user. Similarly, the adjusted premium cost of $333.40 for the modified coverage parameters displayed in the Adjusted Premium window 738 may likewise be considered to be excessive. It will be apparent to those of skill in the art that the user can reach their own conclusion by adjusting the slider 724, which creates a corresponding change in the Disparity After Adjustment window 732 and the Adjusted Premium window 738.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments of the invention, such references do not imply a limitation on the disclosure no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments of the invention may include magnetic floppy disks, hard disks, or optical discs such as CD-ROMs or DVDs. A storage device used for storing firmware or hardware modules in accordance with an embodiment of the disclosure may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited to the disclosure in the form disclosed. It will be apparent to those of skill in the art that many modifications and variations are possible without departing from the scope and spirit of the disclosure, giving full cognizance to equivalents in all respects.

What is claimed is:

1. A system comprising:

A computer processor;

a data bus coupled to the computer processor; and a non-transitory computer-usable medium embodying computer program code, the computer usable medium being coupled to the data bus, the computer program code for pricing modeled insurance coverage and comprising instructions executable by the computer processor and configured for:

displaying within a user interface, a plurality of claim scenario parameters for an insurance policy issued to a member, wherein the insurance policy includes a first premium, wherein the plurality of claim scenario parameters include damage to a property and injury to a person, and wherein the insurance policy includes a first plurality of coverage parameters and a first plurality of associated coverage limits comprising:

a coverage parameter related to damage to the property and an associated coverage limit for damage to the property; and a coverage parameter related to injury to the person and an associated coverage limit for injury to the person;

receiving a plurality of selected claim scenario parameters and associated value selections for each of the plurality of selected claim scenario parameters;

generating a claim scenario, using the computer processor, from a plurality of claim data using the plurality of selected claim scenario parameters and the associated value selections for each of the selected claim scenario parameters, wherein the claim scenario includes monetary amounts for the damage to the property and the injury to the person;

generating, using the computer processor, a first plurality of coverage parameter disparities using said claim scenario and said first plurality of associated coverage limits, wherein at least one coverage parameter disparity represents a difference between the monetary amount for the damage to the property and the associated coverage limit for damage to the property, and wherein at least one coverage parameter disparity represents a difference between the monetary amount for the injury to the person and the associated coverage limit for injury to the person;

modifying within the user interface said first plurality of associated coverage limits to partially or fully offset said first set of coverage parameter disparities, thereby generating a second plurality of coverage parameters, a second plurality of associated coverage limits, and a second set of coverage parameter disparities; and calculating a second premium from said second plurality of coverage parameters, said second plurality of associated coverage limits, and a plurality of pricing data.

2. The system of claim 1, further comprising displaying within said user interface at least one of:
a description of said claim scenario;
said plurality of claim data;
said plurality of selected claim scenario parameters;
said first and second pluralities of coverage parameters;
said first and second pluralities of associated coverage limits;
said first and second sets of coverage parameter disparities;
said plurality of pricing data; or
a first premium and said second premium.

3. The system of claim 1, wherein said first plurality of associated coverage-limits are represented as graphical elements within said user interface and comprise:
current coverage limits affecting the current price of said first premium; and
minimum and maximum coverage limits affecting the minimum and maximum price of said second premium.

4. The system of claim 3, wherein said modifying of said first plurality of associated coverage limits is performed in response to a user gesture interacting with said graphical elements within said user interface.

5. The system of claim 1, wherein:
said modifying of said first plurality of associated coverage limits is performed automatically; and
said automatic modification of said first plurality of associated coverage limits is displayed as graphical elements within said user interface.

6. The system of claim 1, wherein:
said claim data comprises a plurality of representative peer claim data; and
said plurality of representative peer claim data is displayed as graphical elements within said user interface.

7. The system of claim 1, wherein:
said claim data comprises a plurality of historical claim data; and
said plurality of historical claim data is displayed as graphical elements within said user interface.

8. A computer-implementable method for pricing modeled insurance coverage, comprising:
displaying within a user interface, a plurality of claim scenario parameters for an insurance policy issued to a member, wherein the insurance policy includes a first premium, wherein the plurality of claim scenario parameters include damage to a property and injury to a person, and wherein the insurance policy includes a first plurality of coverage parameters and a first plurality of associated coverage limits comprising:
a coverage parameter related to damage to the property and an associated coverage limit for damage to the property; and
a coverage parameter related to injury to the person and an associated coverage limit for injury to the person;

receiving a plurality of selected claim scenario parameters and associated value selections for each of the plurality of selected claim scenario parameters;

generating a claim scenario, using the computer processor, from a plurality of claim data using the plurality of selected claim scenario parameters and the associated value selections for each of the selected claim scenario parameters, wherein the claim scenario includes monetary amounts for the damage to the property and the injury to the person;

generating, using the computer processor, a first plurality of coverage parameter disparities using said claim scenario and said first plurality of associated coverage limits, wherein at least one coverage parameter disparity represents a difference between the monetary amount for the damage to the property and the associated coverage limit for damage to the property, and wherein at least one coverage parameter disparity represents a difference between the monetary amount for the injury to the person and the associated coverage limit for injury to the person;

modifying within the user interface said first plurality of associated coverage limits to partially or fully offset said first set of coverage parameter disparities, thereby generating a second plurality of coverage parameters, a second plurality of associated coverage limits, and a second set of coverage parameter disparities; and calculating a second premium from said second plurality of coverage, said second plurality of associated coverage limits, parameters and a plurality of pricing data.

9. The method of claim 8, further comprising displaying within said user interface at least one of:
a description of said claim scenario;
said plurality of claim data;
said plurality of selected claim scenario parameters;
said first and second pluralities of coverage parameters;
said first and second pluralities of associated coverage limits;
said first and second sets of coverage parameter disparities;
said plurality of pricing data; or
a first premium and said second premium.

10. The method of claim 8, wherein said first plurality of associated coverage-limits are represented as graphical elements within said user interface and comprise:
current coverage limits affecting the current price of said first premium; and minimum and maximum coverage limits affecting the minimum and maximum price of said second premium.

11. The method of claim 10, wherein said modifying of said first plurality of associated coverage limits is performed in response to a user gesture interacting with said graphical elements within said user interface.

12. The method of claim 8, wherein:
said modifying of said first plurality of associated coverage limits is performed automatically; and
said automatic modification of said first plurality of associated coverage limits is displayed as graphical elements within said user interface.

13. The method of claim 8, wherein:
said claim data comprises a plurality of representative peer claim data; and
said plurality of representative peer claim data is displayed as graphical elements within said user interface.

14. The method of claim 8, wherein:
said claim data comprises a plurality of historical claim data; and
said plurality of historical claim data is displayed as graphical elements within said user interface.

15. A computer-usable medium embodying computer program code, the computer program code comprising computer executable instructions configured for:
displaying within a user interface, a plurality of claim scenario parameters for an insurance policy issued to a member, wherein the insurance policy includes a first premium, wherein the plurality of claim scenario parameters include damage to a property and injury to a person, and wherein the insurance policy includes a first plurality of coverage parameters and a first plurality of associated coverage limits comprising:
a coverage parameter related to damage to the property and an associated coverage limit for damage to the property; and
a coverage parameter related to injury to the person and an associated coverage limit for injury to the person;
receiving a plurality of selected claim scenario parameters and associated value selections for each of the plurality of selected claim scenario parameters;
generating a claim scenario, using the computer processor, from a plurality of claim data using the plurality of selected claim scenario parameters and the associated value selections for each of the selected claim scenario parameters, wherein the claim scenario includes monetary amounts for the damage to the property and the injury to the person;
generating, using the computer processor, a first plurality of coverage parameter disparities using said claim scenario and said first plurality of associated coverage limits, wherein at least one coverage parameter disparity represents a difference between the monetary amount for the damage to the property and the associated coverage limit for damage to the property, and wherein at least one coverage parameter disparity represents a difference between the monetary amount for the injury to the person and the associated coverage limit for injury to the person;
modifying within the user interface said first plurality of associated coverage limits to partially or fully offset said first set of coverage parameter disparities, thereby generating a second plurality of coverage parameters, a second plurality of associated coverage limits, and a second set of coverage parameter disparities; and
calculating a second premium from said second plurality of coverage parameters, said second plurality of associated coverage limits, and a plurality of pricing data.

16. The computer usable medium of claim 15, further comprising displaying within said user interface at least one of:
a description of said claim scenario;
said plurality of claim data;
said plurality of selected claim scenario parameters;
said first and second pluralities of coverage parameters;
said first and second pluralities of associated coverage limits;
said first and second sets of coverage parameter disparities;
said plurality of pricing data; or
a first premium and said second premium.

17. The computer usable medium of claim 15, wherein said first plurality of associated coverage-limits are represented as graphical elements within said user interface and comprise:
current coverage limits affecting the current price of said first premium; and
minimum and maximum coverage limits affecting 5 the minimum and maximum price of said second premium.

18. The computer usable medium of claim 17, wherein said modifying of said first plurality of associated coverage limits is performed in response to a user gesture interacting with said graphical elements within said user interface.

19. The computer usable medium of claim 15, wherein:
said modifying of said first plurality of associated coverage limits is performed automatically; and
said automatic modification of said first plurality of associated coverage limits is displayed as graphical elements within said user interface.

20. The computer usable medium of claim 15, wherein:
said claim data comprises a plurality of representative peer claim data; and
said plurality of representative peer claim data is displayed as graphical elements within said user interface.

21. The computer usable medium of claim 15, wherein:
said claim data comprises a plurality of historical claim data; and
said plurality of historical claim data is displayed as graphical elements within said user interface.

* * * * *